Figure 1:
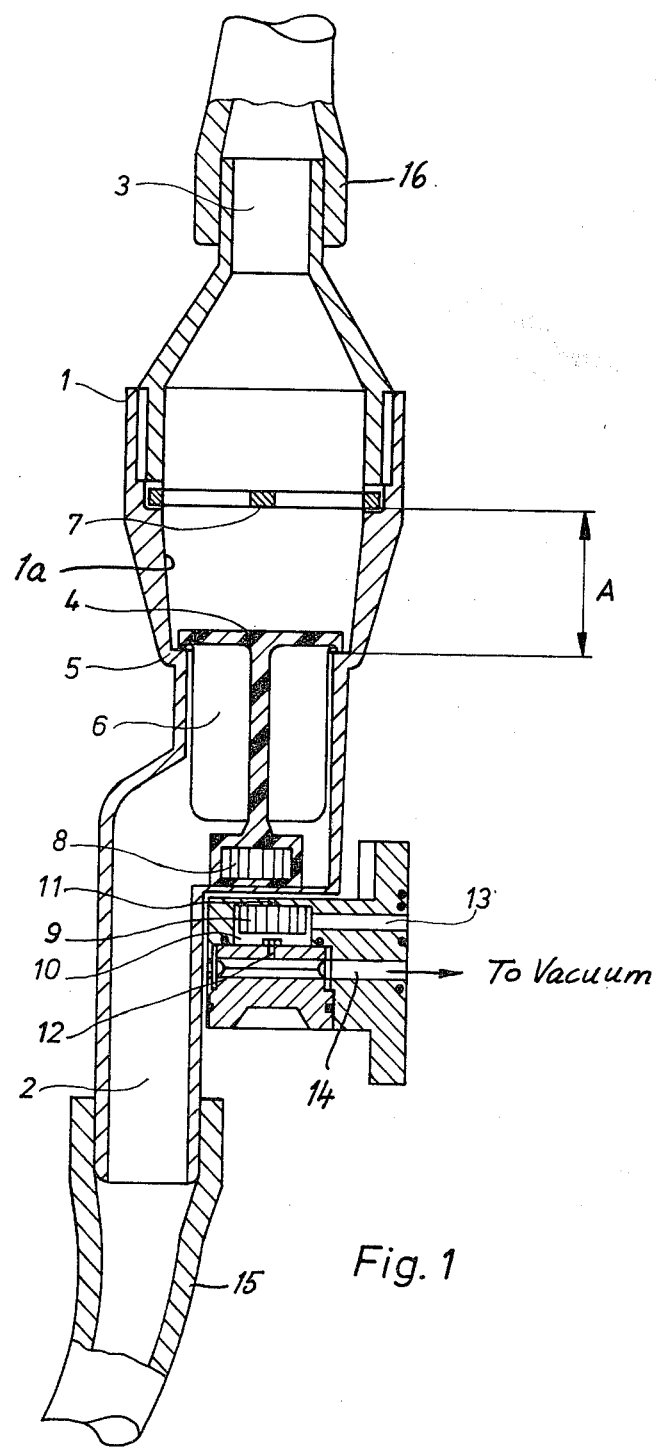

United States Patent [19]

Olander

[11] 4,331,102

[45] May 25, 1982

[54] FLOW INDICATOR FOR MILKING SYSTEM

[75] Inventor: Karl E. Olander, Sodertalje, Sweden

[73] Assignee: Alfa-Laval AB, Tumba, Sweden

[21] Appl. No.: 152,434

[22] Filed: May 22, 1980

Related U.S. Application Data

[63] Continuation-in-part of Ser. No. 912,529, Jun. 5, 1978, abandoned.

[30] Foreign Application Priority Data

Jun. 10, 1977 [SE] Sweden ................................ 7706767

[51] Int. Cl.³ ............................ A01J 5/00; A01J 5/04
[52] U.S. Cl. ................................ 119/14.08; 119/14.15
[58] Field of Search ........................... 119/14.08, 14.15

[56] References Cited

U.S. PATENT DOCUMENTS 4,033,295  7/1977  Soderlund ........................ 119/14.08

Primary Examiner—Hugh R. Chamblee
Attorney, Agent, or Firm—Cyrus S. Hapgood

[57] ABSTRACT

A milk flow indicator comprises a housing in which the milk is adapted to flow upwardly through a seat coacting with a non-return valve having a density higher than that of the milk. The valve is movable upwardly by said milk flow to a first, open position and is movable downwardly, upon cessation of said milk flow, to a second, closed position under the influence of gravity, the sinking velocity and distance of movement of the valve being such that movement of the valve means to said second position takes place after a predetermined time delay.

4 Claims, 2 Drawing Figures

FLOW INDICATOR FOR MILKING SYSTEM

This application is a continuation-in-part of my copending application Ser. No. 912,529 filed June 5, 1978 now abandoned.

The present invention relates to a pipe milking system comprising a milk claw provided with an air outlet connected to a vacuum source and a valve-controlled milk outlet connected to a milk transport conduit via a flow indicator adapted to adjust a pneumatic control valve in response to changes in the milk flow.

Flow indicators are used in milking systems for indicating the magnitude of the milk flow from a cow being milked. By means of this indication, the milker can easily decide when the milking of a cow is finished and thus when the milking means are to be removed from the udder of the cow. In more automated milking systems, flow indicators are used for controlling different operations during milking by means of suitable servo means, such as switching between different vacuum levels or automatic removal of the milking means.

Previously known flow indicators for this purpose usually comprise a receptacle having an inlet and an outlet, and valve means cooperating with a valve seat in the outlet opening in order to uncover the same in relation to the flow of milk through the inlet. The valve means are actuated by a float, the sealing surface between the valve means and the valve seat being provided with a groove or the like which allows a small flow even in the closed position of the valve. When the flow of milk increases above the magnitude that can pass through the groove, the level in the receptacle rises, the float rising with the liquid and actuating the valve means whereby the outlet is successively uncovered. The float may be arranged to actuate a magnetic valve which controls a certain operation (such as the removal of the milking means) in response to the position of the float.

In flow indicators of this kind, the milk flow is often exposed to throttling and change of flow direction which might affect the quality of the milk in a negative sense. Furthermore, they are inappropriate from the point of view of hygiene, since they comprise several elements which are difficult to clean.

In accordance with the present invention, a milk flow indicator is provided by which the above-mentioned drawbacks are avoided and which, furthermore, is arranged to cooperate with a control valve in such manner that the control valve is adjusted with a predetermined time delay after the milk flow has ceased. This is achieved by means of a flow indicator of the kind previously mentioned but which, according to the invention, is generally characterized in that it comprises a non-return valve provided with a valve means having a density higher than that of the milk and which is movable by the milk flow to a first, open position and, after the milk flow has ceased, is movable to a second, closed position under the influence of gravity, the sinking velocity and the distance of movement of the valve means being such that the movement to the second position takes place after a predetermined time delay.

Figure 2:
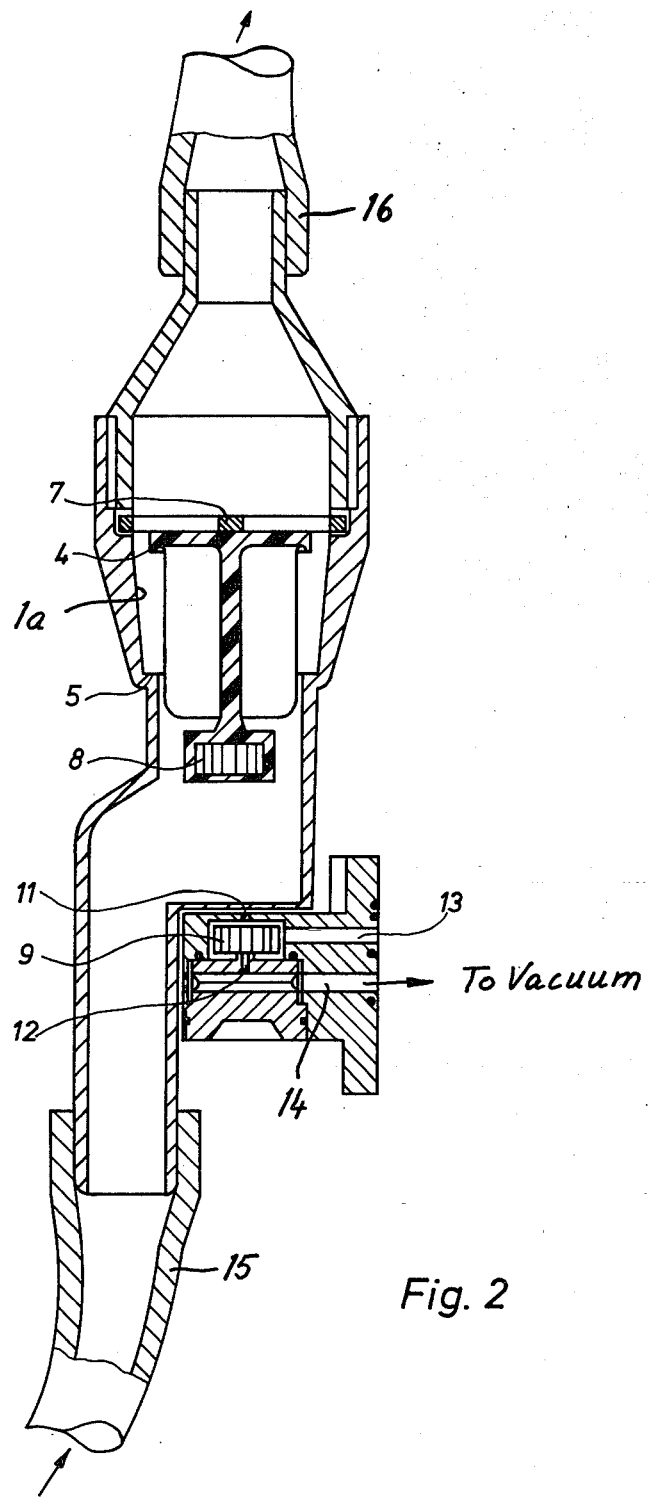

The invention is described in more detail below with reference to the accompanying drawings, in which FIG. 1 is a vertical, longitudinal sectional view of a flow indicator according to the invention in a first position, and FIG. 2 is a similar view of the flow indicator in a second position.

The flow indicator as illustrated comprises a housing 1 having a milk inlet 2 and a milk outlet 3. A vertically movable valve means 4 is provided in the housing 1, the peripheral portion of said valve means cooperating with a valve seat 5 in the housing. The valve means 4 is provided with guide flanges 6 and is movable in a vertical direction a distance A between the seat 5 and an upper stop 7. An inner wall 1a of the housing has a fructo-conical shape between the seat 5 and the stop 7, the diameter of this inner wall increasing gradually in the upward direction.

When appropriate, the inner wall 1a can be of different geometrical shape than that shown in the drawing. For example, it can be made with a lower cylindrical portion and an upper conical portion.

The valve means 4 is provided at its lower end with a magnet 8. The valve means is preferably made of plastic material in which the magnet is molded. The magnet 8 cooperates with a pneumatic control valve comprising a magnetic valve element 9 which is vertically movable in a valve chamber 10. The latter is provided with an upper valve opening 11 connected to the atmosphere, a lower valve opening 12 connected through passage 14 to a vacuum source (not shown), and a passage 13 for the outgoing control signal.

In the position shown in FIG. 1, the valve means 4 sealingly engages the valve seat 5. By the force of attraction between the magnet 8 and the valve element 9, the latter is held in its upper position and closes the upper valve opening 11 while the lower opening 12 is uncovered, whereby signal passage 13 is subjected to the vacuum in passage 14.

When the system is activated, valve means 4 is unseated due to the vacuum created in outlet 3, as will be described presently. Milk then flows in through the inlet 2, which is connected through duct 15 to a milk claw (not shown), and eventually flows through the unseated valve means 4. When the milk flow is small, the upwardly acting force on valve means 4 is insufficient to overcome the downwardly acting force due to the magnet 8 and the weight of the valve means 4. Thus, the latter remains only slightly unseated, whereby the attraction force between the magnet 8 and the valve element 9 is maintained and the latter remains in its upper position, as shown in FIG. 1. Thus, passage 13 continues to be subjected to vacuum.

When the milk flow exceeds a predetermined magnitude, for example 200 g per minute, the valve means 4 is moved further upward under the influence of the increased milk flow, the distance between the magnet 8 and the magnetic valve element 9 increasing to such extent that the element 9 is no longer held in the upper position shown in FIG. 1 but drops to the position shown in FIG. 2. The lower opening 12 is then closed and the upper opening 11 is opened, whereby the valve chamber 10 is connected to the atmosphere. The pneumatic signal going out through the passage 13 is consequently changed from vacuum to atmospheric pressure.

The adjustment of the control valve 9 at the right moment, i.e., at the desired magnitude of the milk flow, is obtained by suitable selection of the cone angle or other shape of the above-mentioned inner wall 1a of the housing 1. When the attraction force between the magnet 8 and the valve element 9 has ceased, the valve means 4 is actuated by the milk flow to move upward until it engages the stop 7, the maximum through flow area being then uncovered.

When the milk flow decreases towards the end of the milking process so as to fall below the predetermined level (for example, 200 g per minute), the milk flow ceases in that the outlet of the milk claw is closed in a known manner by the float controlled valve disposed therein. The valve means 4 then sinks back to the position of FIG. 1, whereby the magnetic control valve 9 is again adjusted. By selecting a certain density of the valve means 4 in relation to that of the milk, the desired sinking velocity can be obtained. The sinking velocity is also influenced by the angle of taper or other geometric shape of the inner wall 1a within the distance A. The distance A may likewise be varied in order to obtain a suitable time delay of the adjustment of the control valve after cessation of the milk flow, for example 20 seconds.

Since the valve means 4 in its lowest position sealingly engages the seat 5, the milk is prevented from flowing back downward if the pressure above the valve means should rise, which is the case when the vacuum connection to the milk transport conduit is interrupted.

It will be understood that outlet 3 of the flow indicator is connected to a duct 16 leading to a milk transport conduit which, when the system is activated, subjects outlet 3 to a vacuum sufficient to unseat valve 4 even without a groove or drain opening through which outlet 3 communicates with inlet 2 when valve 4 is seated.

Of course, in any case where complete sealing of valve 4 in its seated position is not needed, such a groove or drain opening can be provided in seat 5 or valve 4. However, I prefer to avoid any need for the groove or drain opening by suitable selection of values for the variables involved, which selection will be readily apparent to those skilled in the art.

The following is an example of such selected values:
Weight of valve means 4 = 20 g.
Area of valve means 4 = 9 cm$^2$.
Pressure difference (17 cm Hg) between pressure above and pressure below valve means 4 when system is activated (which difference acts upwardly on the valve means) = 22 k Pa.
Force of magnet 8 = 0.5 N.

In the above, and according to the SI system, k Pa means kilopascal and N means newton. 1 Pa = 1 N/m$^2$ = 10$^{-5}$ bar = 10.20×10$^{-6}$ kp/cm$^2$ = 0.1450×10$^{-3}$ psi = 7.501×10$^{-3}$ mm Hg.

The above example provides a valve-closing force of 0.7 N and a valve-opening force of 20 N when valve means 4 is in closed position and the system is activated, thus ensuring that valve means 4 will open even without the groove or drain opening. These forces are calculated as follows (round figures):

Closing force $$0.02\ (kp) \times 9.81 + 0.5 = 0.2 + 0.5 = 0.7 N$$

Opening force $$22 \times 10^3\ (Pa) \times 0.9 \times 10^{-3}\ (m^2) = 22 \times 0.9 = 20\ N$$

I claim:

1. In a milking system having a first duct for conveying milk from a milk claw and a second duct adapted to be maintained under vacuum for conveying milk to a transport conduit, a milk flow indicator comprising a housing having an inlet to which said first duct leads and also having an outlet from which said second duct leads, the housing containing a valve seat between said inlet and said outlet, and valve means in the housing coacting with said seat and having a density higher than that of the milk, said vacuum being operable to create a flow of milk through said inlet and raise the valve means to a first, open position, said valve means being movable downwardly upon cessation of said milk flow to a second, closed position under the influence of gravity, the sinking velocity and the distance of said downward movement of the valve means being selected to provide a predetermined time delay in said movement of the valve means to said second position, the housing having below said outlet an inner fructo-conical wall surrounding the valve means along at least a portion of its distance of movement, said inner wall having a diameter which increases gradually upwardly to provide a decreasing throughflow area for the milk as the valve means moves downwardly.

2. The milk flow indicator of claim 1, comprising also a pneumatic control valve coacting with the valve means and movable to one position in response to movement of the valve means to said first position, the control valve being movable to another position in response to movement of the valve means to said second position.

3. The milk flow indicator of claim 1, in which the valve means in said second position coacts with the valve seat to prevent return flow of milk from said outlet to said inlet.

4. The milk flow indicator of claim 1, in which said valve means includes an upper part adapted to rest on said valve seat and also includes a lower part below said seat, the indicator also comprising a magnet carried by said lower part, and a pneumatic control valve coacting with said magnet and movable to one position in response to movement of the valve means to said first position, the control valve being movable to another position in response to movement of the valve means to said second position, the housing having an inner fructo-conical wall surrounding said upper part of the valve means along at least a portion of its distance of movement.

* * * * *